United States Patent [19]
Okamoto et al.

[11] Patent Number: 5,191,591
[45] Date of Patent: Mar. 2, 1993

[54] LASER WAVELENGTH CONVERTER

[75] Inventors: Sota Okamoto; Kiyofumi Chikuma, both of Saitama, Japan

[73] Assignee: Pioneer Electronic Corporation, Tokyo, Japan

[21] Appl. No.: 729,349

[22] Filed: Jul. 12, 1991

[30] Foreign Application Priority Data

Oct. 29, 1990 [JP] Japan .................................. 2-291348

[51] Int. Cl.$^5$ .............................................. H01S 3/08
[52] U.S. Cl. ...................................... 372/101; 372/22; 372/93; 372/94; 372/99; 372/100
[58] Field of Search .................... 372/101, 99, 93, 94, 372/100, 22

[56] References Cited

U.S. PATENT DOCUMENTS 2,882,784  4/1959  Toffolo .
4,203,652  5/1980  Hanada .............................. 372/101

FOREIGN PATENT DOCUMENTS 342523  11/1989  European Pat. Off.* .

OTHER PUBLICATIONS

Journal of Applied Physics, P. D. Coleman, vol. 31, No. 9, Sep. 1960, pp. 1695–1696.

Primary Examiner—Georgia Y. Epps
Attorney, Agent, or Firm—Keck, Mahin & Cate

[57] ABSTRACT

A stable wavelength converting apparatus comprising an axicon having a convex conical surface on that side where a second harmonics enters and a concave conical surface on the light-leaving side. This design feature can reduce the deviation of the collimation by the axicon.

5 Claims, 2 Drawing Sheets

LASER WAVELENGTH CONVERTER

BACKGROUND OF THE INVENTION

1. Field of the Invention

The present invention relates to a laser wavelength converting apparatus using an optical fiber type wavelength converter.

2. Description of the Related Art

FIGS. 1A and 1B illustrate conventional wavelength converting apparatuses in use.

Referring to the diagrams, a laser beam from a laser light source 1 reaches an optical fiber type wavelength converter 2 to cause Cerenkov radiation of a second harmonic of the laser beam. The Cerenkov radiation beam is collimated by a conical lens (axicon) 3, and the collimated beam is then put through an objective lens (not shown) to provide a beam spot.

The axicon in use has one surface 31 shaped in a convex cone and the other surface 32 formed normal to a laser optical axis 4, as shown in FIG. 1A, or has both surfaces shaped in a convex cone, as shown in FIG. 1B.

When the radiation angle of the second harmonics changes due to a possible variation in the core diameter of the fiber type wavelength converter, a change in refractive index caused by a change in temperature of a non-linear optical material filled in the core, etc., the collimation by the axicon lens becomes incomplete, undesirably resulting in deteriorated performance, such as reduction in the amount of the main lobe of a focused spot or increase in the diameter of the spot.

SUMMARY OF THE INVENTION

It is therefore an object of the present invention to provide a wavelength converting apparatus which can minimize the deviation of the degree of collimation of the beam from the axicon with respect to the deviation of the radiation angle of the second harmonics from the optical fiber type wavelength converter.

A wavelength converting apparatus according to the present invention is characterized in that the apparatus comprises an axicon lens having two conical surfaces, a convex conical surface on a Cerenkov radiation side cone and a concave conical surface on an opposite side.

According to an optical fiber type wavelength converting apparatus of the present invention, there will be a small deviation of the collimation by the axicon when the Cerenkov radiation angle of the second harmonics is changed.

DETAILED DESCRIPTION OF THE PREFERRED EMBODIMENT

Figure 1A:
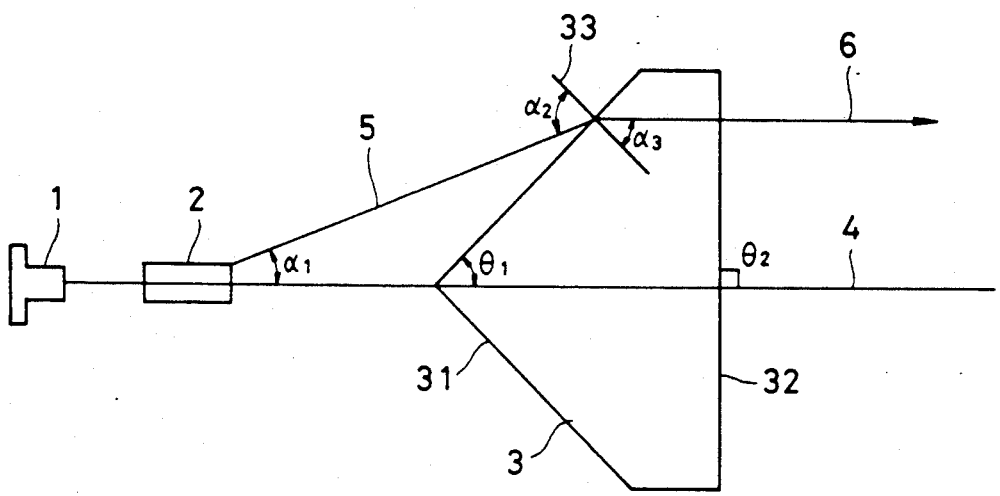
FIGS. 1A and 1B are diagrams illustrating prior art.
Figure 1B:
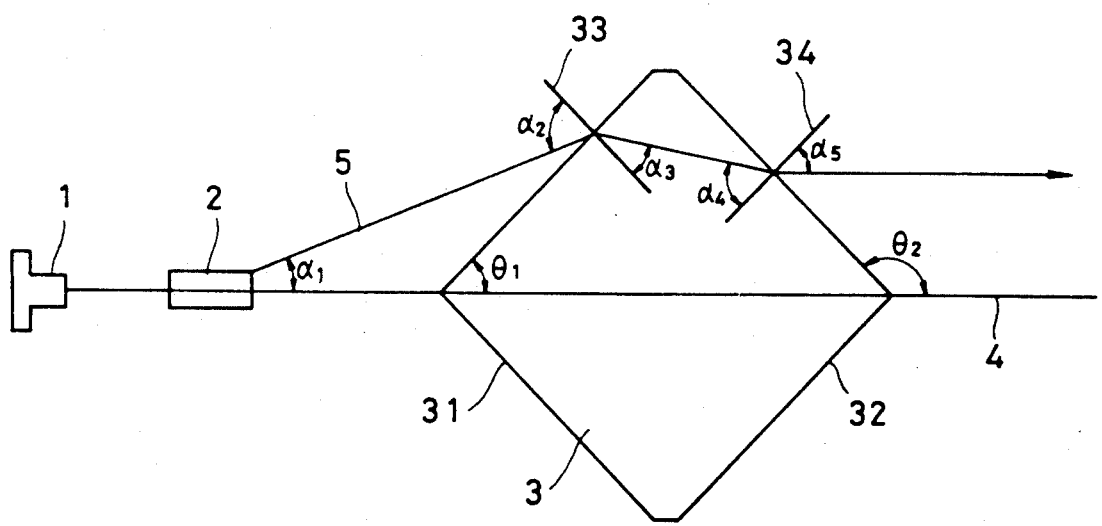
Figure 2:
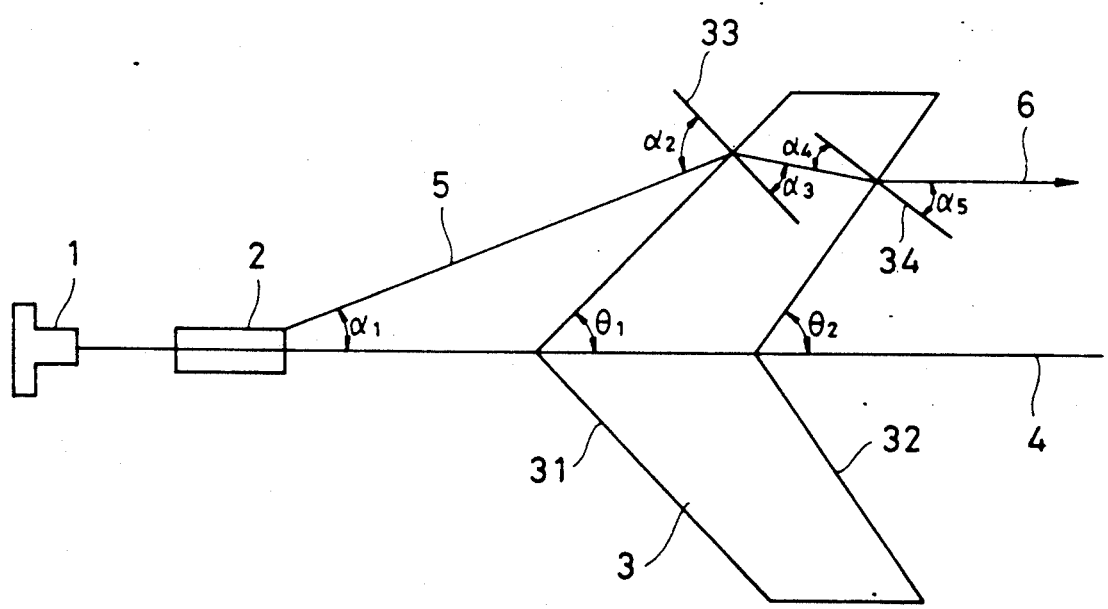
FIG. 2 is a diagram illustrating an embodiment of the present invention.

FIG. 2 illustrates a preferred embodiment of the present invention. Referring to this diagram, a laser beam emitted from a laser light source 1 reaches an optical fiber type wavelength converter 2, which in turn causes Cerenkov radiation of a second harmonics in accordance with the received laser beam. An axicon 3 refracts the Cerenkov radiation at its first surface 31 and second surface 32 to thereby convert a plane wave. The first and second surfaces 31 and 32 respectively form angles of $\theta_1$ and $\theta_2$ with respect to a laser optical axis 4.

The Cerenkov radiated second harmonics from the optical fiber type wavelength converter 2 is irradiated at an angle $\alpha_1$ with respect to the laser optical axis 4, entering the first surface 31 of the axicon 3 at an angle $\alpha_2$ with respect to the normal of the first surface 31, and is refracted there, propagating through the Axicon 3 at a leaving angle $\alpha_3$. The second harmonics then reaches the second surface 32 at angle $\alpha_4$ with respect to the normal thereof, and is refracted there, leaving the axicon 3 at an angle $\alpha_5$.

From the above-described geometric relationship, $\alpha_2$, $\alpha_3$, $\alpha_4$ and $\alpha_5$ satisfy the following equations.

$$\alpha_2 = \pi/2 - \theta_1 + \alpha_1 \tag{1}$$

$$\alpha_3 = \sin^{-1}(\sin\alpha_2/n) \tag{2}$$

$$\alpha_4 = \theta_1 - \theta_2 + \alpha_3 \tag{3}$$

$$\alpha_5 = \sin^{-1}(n\sin\alpha_4) \tag{4}$$

where n is a refractive index of the axicon.

With the deviation of the beam leaving the second surface 32 of the axicon 3 from the laser optical axis 4 being denoted by U and the differential coefficient of $\alpha_5$ with respect to $\alpha_1$ being denoted by $v$, the following equations are yielded:

$$U = \alpha_5 + \theta_2 - \frac{\pi}{2}$$

$$v = \frac{d\alpha_5}{d\alpha_1} = \frac{\cos\alpha_4 \cdot \cos\alpha_2}{\cos\alpha_5 \cdot \cos\alpha_3}$$

The shape of the axicon 3, which permits the beam leaving the Axicon 3 to be stably parallel to the laser optical axis 4 with a change in Cerenkov radiation angle $\alpha_1$ and make this change smaller, is determined from the above equations. With U=0, the refractive index n of the axicon 3, the inclined angle $\theta_2$ of the first surface and the inclined angle $\theta_2$ of the second surface are to be so selected as to make the value of $v$ smaller. $v$ will be expressed only in terms of $\theta_1$, $\theta_2$, n, $\alpha_1$ and $\alpha_5$ as follows by substituting the equations (1) to (4) into the above equation of $v$.

$$v = \frac{\cos\{\sin^{-1}(\sin\alpha_5/n)\} \cdot \cos\left(\frac{\pi}{2} - \theta_1 + \alpha_1\right)}{\cos\alpha_5 \cdot \cos\left[\sin^{-1}\left\{\sin\left(\frac{\pi}{2} - \theta_1 + \alpha_1\right)/n\right\}\right]}$$

$$= \frac{\cos\{\sin^{-1}(\sin\alpha_5/n)\} \cdot \sin(\theta_1 - \alpha_1)}{\cos\alpha_5 \cdot \cos[\sin^{-1}\{\cos(\theta_1 - \alpha_1)/n\}]}$$

Since the collimation condition should be satisfied, $$U = \alpha_5 + \theta_2 - \pi/2 = 0$$

or $$\alpha_5 = \pi/2 - \theta_2.$$

Substituting the latter equation into the previous equation of $v$ yields $$v = \frac{\cos\left[\sin^{-1}\left(\sin\left(\frac{\pi}{2} - \theta_2\right)/n\right)\right] \cdot \sin(\theta_1 - \alpha_1)}{\cos\left(\frac{\pi}{2} - \theta_2\right) \cdot \cos[\sin^{-1}\{\cos(\theta_1 - \alpha_1)/n\}]}$$

$$= \frac{\cos\{\sin^{-1}(\cos\theta_2/n)\} \cdot \sin(\theta_1 - \alpha_1)}{\sin\theta_2 \cdot \cos[\sin^{-1}\{\cos(\theta_1 - \alpha_1)/n\}]}$$

To make $v$ smaller, the numerator in the above equation should approach 0. Thus, $$\cos\{\sin^{-1}(\cos\theta_2/n)\} \to 0 \qquad (A)$$

or $$\sin(\theta_1 - \alpha_1) \to 0 \qquad (B)$$

From the condition (A), $v$ becomes minimum if $\cos\theta_2 \approx n$. As $n > 1.0$ and $\cos\theta_2 \leq 1$, $\theta_2$ should approach 0.

From the condition (B), $v$ becomes minimum if $\theta_1 \approx \alpha_1$. If $\theta_1 = \alpha_1$, however, the light would not intersect the axicon 3, so that this condition is improper.

It is therefore obvious that the closer $\theta_1$ to $\alpha_1$, it is better to minimize $v$. Here $\alpha_1$ is in the range of $$0 < \alpha_1 < \pi/2.$$

To acquire the desirable shape of the axicon lens which makes $v$ smaller and provides a stable output with respect to a deviation of the leaving angle $\alpha_1$, it is preferable that $\theta_1$ and $\theta_2$ both become acute.

In other words, the axicon lens will provide a stable output if it is shaped in such a way as to have a convex conical surface on the Cerenkov radiation side and a concave conical surface on the opposite side.

Let us now consider collimation of the Cerenkov radiation angle $\alpha_1 = 20°$. With two axicons A and B in use, which have the following specifications, the deviations of the beams leaving the axicons from the laser optical axis with respect to the deviation of the Cerenkov radiation angle $\alpha_1$ will specifically be compared with each other.

Example A $\theta_1 = 59.463°$ $\theta_2 = 90°$
$n = 1.51947$
$U = 0$
$v = 0.738$ Example B $\theta_1 = 30°$
$\theta_2 = 40.245°$
$n = 1.51947$
$U = 0$
$v = 0.305$ Example A is prior art in which the first surface 31 is convex and the second surface 33 is normal to the laser optical axis 4, while Example B is the embodiment of the present invention.

With $U = 0$, Examples A and B both can ensure complete collimation. Let us now consider the deviation of the beam leaving the axicon from the laser optical axis 4, U, when the leaving angle of the Cerenkov radiation is shifted by $1°(\alpha_1 = 21°)$. The deviation of the beam from the laser optical axis 4 in the case of the axicon of Example A is $U = 0.732°$, while the same deviation in the case of the axicon of Example B becomes $U = 0.292°$.

More specifically, when the radiation angle of the second harmonics changes due to a possible variation in the core diameter of the optical fiber type wavelength converter 2, a change in refractive index caused by a change in temperature of a non-linear optical material filled in the core, etc., the deviation of the collimation by the axicon according to the present invention can be reduced to about 40% of what can be done by the prior art.

Accordingly, it is possible to prevent deterioration of the performance of the wavelength converter, such as reduction in the amount of the main lobe of a focused spot or increase in the diameter of the spot, which has been insufficiently suppressed by the prior art.

As the axicon is shaped in such a way as to have a convex conical surface on the Cerenkov radiation side and a concave conical surface on the opposite side, the deviation of the collimation by the axicon can be made smaller even when the radiation angle of the second harmonics is changed. It is therefore possible to provide a wavelength converting apparatus whose characteristic will not be significantly deteriorated even with respect to a change in the radiation angle of the second harmonics due to a possible variation in the core diameter of the fiber type wavelength converter caused at the time it is manufactured, a change in refractive index caused by a change in temperature of a non-linear optical material filled in the core, etc.

What is claimed is:

1. In a laser wavelength converting apparatus comprising a laser light source, an optical fiber type wavelength converter for generating a second harmonic from a laser beam emitted from the laser light source and an axicon lens for collimating the second harmonic radiated from the wavelength converter, the improvement which comprises the axicon lens having two conical surfaces, a convex conical surface on a Cerenkov radiation side and a concave conical surface on an opposite side.

2. The improvement of claim 1, wherein said axicon lens has a refractive index between 1.5 and 1.6.

3. The improvement of claim 1, wherein said axicon lens comprises a material having a temperature dependent refractive index.

4. The improvement of claim 1, wherein said laser wavelength converting apparatus has a laser optical axis defined by said laser beam, said convex conical surface defines a first acute angle with respect to said laser optical axis, said concave conical surface defines a second acute angle with respect to said laser optical axis, and said first and second acute angles are unequal.

5. The improvement of claim 4, wherein said second acute angle is greater than said first acute angle.

* * * * *